United States Patent
Rosene et al.

(10) Patent No.: US 8,342,167 B2
(45) Date of Patent: Jan. 1, 2013

(54) FLOATING SOLAR HEATER WITH STABILIZING BAND

(76) Inventors: Richard C. Rosene, Murrieta, CA (US); Lora J. Rosene, Murrieta, CA (US)

( * ) Notice: Subject to any disclaimer, the term of this patent is extended or adjusted under 35 U.S.C. 154(b) by 142 days.

(21) Appl. No.: 12/932,531

(22) Filed: Feb. 28, 2011

(65) Prior Publication Data

US 2011/0146659 A1  Jun. 23, 2011

Related U.S. Application Data

(63) Continuation-in-part of application No. 11/507,918, filed on Aug. 22, 2006, which is a continuation-in-part of application No. 10/875,933, filed on Jun. 24, 2004, now Pat. No. 7,093,593.

(51) Int. Cl.
*F24J 2/42* (2006.01)

(52) U.S. Cl. ............... 126/566; 126/561; 126/565

(58) Field of Classification Search ........... 126/561–568, 126/624, 714; 4/498, 499, 503, 493, 488, 4/41; 405/219, 26, 68–71; 441/40, 41, 35, 441/131, 88, 129; D23/316; 5/710
See application file for complete search history.

(56) References Cited

U.S. PATENT DOCUMENTS

| | | | | |
|---|---|---|---|---|
| 2,672,628 A | * | 3/1954 | Spanel | 5/655 |
| 4,744,326 A | * | 5/1988 | Harding | 114/345 |
| 5,679,040 A | * | 10/1997 | Bianchi-Holm | 441/129 |
| 6,220,908 B1 | * | 4/2001 | Peterson | 441/66 |

* cited by examiner

*Primary Examiner* — Thomas Denion
*Assistant Examiner* — Daniel Bernstein
(74) *Attorney, Agent, or Firm* — Marc Martino

(57) ABSTRACT

A soft, flexible, floating solar heater for floating on liquid generally comprises an inflatable central portion and an inflatable outer ring. The central portion is constructed of upper and lower film bonded together at a central peripheral bond such that, upon inflation, the central portion contracts. A vertical band in the outer ring prevents buckling of the ring from inward contraction of the central portion upon inflation of the central portion. A non-inflated spacer ring may be positioned between the central portion and outer ring to disperse contraction forces and reduce the tendency for the outer ring to buckle.

19 Claims, 3 Drawing Sheets

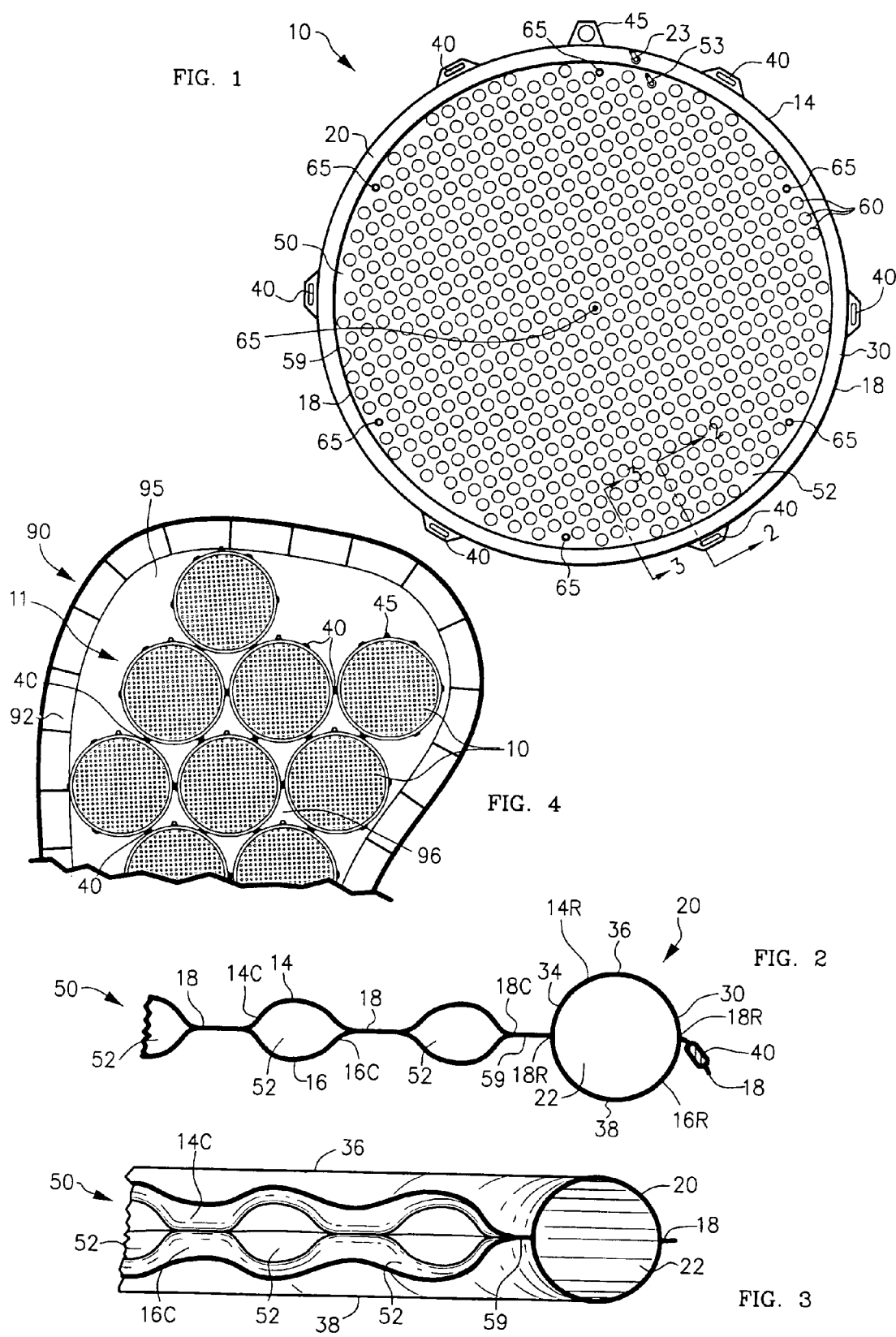

FLOATING SOLAR HEATER WITH STABILIZING BAND

CROSS-REFERENCE TO RELATED APPLICATIONS

This application is a continuation-in-part of co-pending application Ser. No. 11/507,918, filed Aug. 22, 2006, which is a continuation-in-part of application Ser. No. 10/875,933, filed Jun. 24, 2004, now U.S. Pat. No. 7,093,593 issued Aug. 22, 2006, and incorporated herein in their entireties by reference.

FIELD OF THE INVENTION

This invention relates in general to floating solar pool heaters, and more specifically involves a soft, flexible, floating solar heater with a stabilizing band to assure the heater lies flat and in contact with the water.

BACKGROUND OF THE INVENTION

Our U.S. Pat. No. 7,093,593 B2 issued Aug. 22, 2006 titled "Floating Solar Pool Heater" describes a soft, flexible, floating solar pool heater made of planar upper and lower films bonded together to form a thin inflatable central portion for providing the major solar heat gathering and heat transfer to the water and a thicker inflatable outer ring connected to the periphery of the central portion for providing flotation and greater rigidity. In a preferred embodiment, in the inflatable central portion, a plurality of spaced spot welds between the upper and lower films hold the films in close proximity when the central portion is inflated. The central portion should lie directly on the water to transfer the solar energy thereto.

With this design, it can be understood that inflation of the central portion causes the periphery of the central portion to radially shrink because the upper and lower films in the central area are pushed apart. This central shrinkage puts radially inward stress on the outer ring. The magnitude and locations of the radial stress on the outer ring is partly determined by the shape and locations of the bonds between the upper and lower film in the central portion and is partially determined by the inflation pressure with greater pressure producing greater stress.

Excessive inflation of the central portion, such as by initial over inflation by the user or by further expansion of the inflation gas as it warms in the sunlight, may cause the outer ring to upwardly buckle. Buckling of the outer ring is undesirable because the buckled portion of the outer ring lifts the central portion of the water such that solar energy is not optimally transferred to the water and also because the upwardly buckled portion is susceptible to being lifted by the wind such that the heater is more readily blown from the pool.

Therefore, it is desirable to have an improved floating solar pool heater that overcomes the tendency of the outer ring to buckle.

SUMMARY OF THE INVENTION

This invention is a soft, flexible, floating solar heater for floating on liquid and it generally comprises an inflatable central portion and an inflatable outer ring. The central portion gathers solar energy and transfers the energy to the water. The central portion is constructed of upper and lower films bonded together at a central peripheral bond such that, upon inflation, the central portion contracts. An outer ring adds flotation and stiffness to the central portion. A vertical band in the outer ring prevents buckling of the ring from inward contraction of the central portion upon inflation of the central portion.

The band may be added to the outer ring of a heater constructed of upper and lower planar films or may be part of an independently constructed ring that is attached to the inflatable central portion. A non-inflated spacer ring may be positioned between the central portion and outer ring to disperse contraction forces and reduce the tendency for the outer ring to buckle.

The features and advantages of the invention will be readily understood when the detailed description thereof is read in conjunction with the drawings, wherein like reference numerals refer to like parts throughout.

BRIEF DESCRIPTION OF THE DRAWINGS

FIG. 1 is a top plan view of a floating pool heater.
FIG. 2 is an enlarged sectional view taken on line 2-2 of FIG. 1.
FIG. 3 is an enlarged sectional view taken on line 3-3 of FIG. 1.
FIG. 4 is a top plan view of a plurality of floating pool heaters of FIG. 1 in use in a swimming pool.

DETAILED DESCRIPTION OF THE INVENTION

Figure 5:
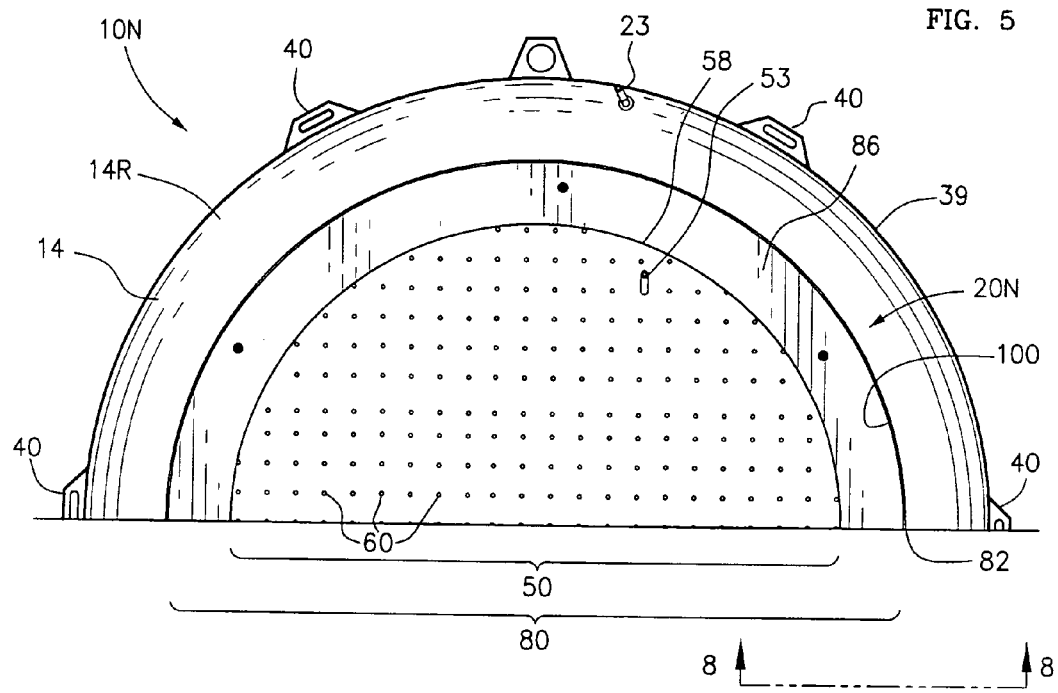
FIG. 5 is a one-half top plan view of the floating pool heater of the present invention.

With reference now to the drawings, FIG. 1 is a top plan view of a floating pool heater 10, FIG. 2 is an enlarged sectional view taken on line 2-2 of FIG. 1, FIG. 3 is an enlarged sectional view taken on line 3-3 of FIG. 1, and FIG. 4 is a top plan view of a plurality of floating pool heaters 10 of FIG. 1 in use floating on water 95 in a swimming pool 90.

Heater 10 is soft and flexible so as to present no hazard should a person fall onto heater 10 either in pool 90 or outside of pool 90. Heater 10 generally comprises an outer ring 20 and central portion 50. A preferred embodiment of heater 10 is primarily constructed, as best seen in FIGS. 1 and 2, of upper film 14, such as upper film 14R of ring 20 and upper film 14C of central portion 50, and lower film 16, such as lower film 16R of ring 20 and lower film 16C of central portion 50. The film may be of thin plastic, such as of vinyl, bonded, such as by radio frequency bonding, at bonds 18 so as to form the general structure.

Outer ring 20 includes upper film 14R and lower film 16R bonded at bonds 18R to define a chamber 22 that is inflatable or turgesible with a fluid, such as a gas, such as air, or a liquid, such as water, such as pool water, through a valve, such as valve 23. Valve 23 may be any conventional valve, such as a bore and a stopper, which can control ingress and egress of fluid to and from chamber 22. Outer ring 20 includes a radially outward side 30, a radially inward side 34, a top 36, and a bottom 38. Top 36 and bottom 38 of ring 20 generally define spaced parallel planes.

Central portion 50 is disposed centrally of outer ring 20 and includes an upper film 14C and a lower film 16C joined, such as by bond 18C around periphery 59 of central portion 50, to upper film 14C to define a cavity 52 therebetween for holding a gas. Cavity 52 has an area in top view. Periphery 59 of central portion 50 is connected to ring 20, such as to radially inward side 34. Inflation and deflation means, such as valve 53, controls ingress and egress of gas, such as air, to and from cavity 52. When cavity 52 is inflated with air, heater 10 will float on water 95. Preferably, central portion 50 contains a single inflatable cavity 52 to facilitate inflation and deflation.

Connection means, such as plurality of spot welds 60, connect upper film 14C and lower film 16C central of periphery 59 such that upper film 14C and lower film 16C of cavity 52 are held in proximity and preferably held, as seen in FIG. 3, between the planes defined by the top 36 and bottom 38 of ring 20, when chamber 22 and cavity 52 are inflated with air and heater 10 is placed on water 95. This ensures that heater 10 floats with maximum contact with water 95; that films 14C, 16C are held in close proximity for superior solar heating properties; and that multiple heaters 10 are stackable when inflated. Close spacing of films 14C, 16C decreases heat loss from convection. Many other connection means, such as webbing or weld lines, are possible. However, welds allow the use of just two films and spot welds 60 provide the most area for cavity 52 while still holding films 14C, 16C in close proximity. Spot welds 60 are disposed in a grid so as to shape upper film 14C into an array of convex surfaces; a convex surface being located between each four welds 60. Each convex surface acts as a lens for intensifying the solar heating effect on lower film 16C. Chamber 22 and cavity 52 are inflatable and deflatable independently of each other.

Central portion 50 includes air escape means, such as a plurality of passages, such as through-holes 65 near periphery 59 and in the center of central portion 50, for allowing air to escape from below central portion 50 when heater 10 is deployed on water 95 and for allowing water on the top of central portion 50, such as from rain or from a decorative water fall, to drain. Holes 65 may be evenly spaced, such as every sixty degrees around the circumference of heater 10. Upon deployment, entrapped air under central portion 50 substantially escapes upward through holes 65 such that the center of central portion 50 is substantially in contact with water 95. Because of the flexibility of heater 10, at proper inflation, heater 10 will conform to waves in pool 90 so as to keep new air from entering under ring 20.

Magnetic means, such as a plurality of spaced magnets 40, are connected to radially outward side 30 of ring 20, for conditioning water 95 and for releasably joining to magnetic means of other heaters 10 to join a plurality of heaters 10 to form a raft 11, as seen in FIG. 4. Magnets 40 may be uniformly spaced, such as every sixty degrees. When heater 10 is floating, magnet 40 is in contact with water 95 and produces a magnetic field in water 95 for conditioning water 95. Magnets 40 may be bonded between upper and lower film 14, 16. Magnets 40 of floating heaters 10 tend to attach themselves to magnets 40 of other similar floating heaters 10 to form rafts 11. Rafts 11 facilitate removal of heaters 10 from pool 90, because when one heater 10 near pool side 92 is grasped, the other heaters 10 in its raft 11 will also be pulled to pool side 92 as the grasped heater 10 is pulled out. Floating heaters 10 in a raft 11 are easily separated by a person in pool 90 such that a person falling into pool 95 is not trapped under raft 11. Other rafting means, besides magnets, may be used, such as mating hoop/loop fasteners, hooks-and-loops, and snaps. Heaters 10 may help float a person who accidentally falls into pool 90.

Heater 10 includes hanging means, such as hanger 45 attached to radially outward side 30 of ring 20, for hanging heater 10, such as on a peg on a wall, during storage. Hanger 45 may be constructed of bonded upper and lower film 14, 16 having a bore therethrough.

As described above, chamber 22 of outer ring 20 and cavity 52 of central portion 50 can be made from just two films, upper film 14 and lower film 16 welded together. Vinyl is the preferred material, but other films could be used.

Preferably, upper film 14 has high transmissivity of sunlight so light easily enters chamber 22 and cavity 52. Upper film 14 may be clear plastic, such as 0.008" thick vinyl. Preferably, lower film 16 has high absorptivity of sunlight and is thicker, for puncture resistance. Lower film 16 may be 0.010" thick vinyl of dark color, such as blue. Preferably, films 14, 16 are resistant to breakdown from ultraviolet light.

Lower film 16 is preferably opaque, absorptive of solar energy, and of relatively high thermal conductivity. Lower film 16 may be provided with a material that will enhance its capability of absorbing solar energy to produce heat. Absorption-enhancing materials are well known and include carbon black, aluminum, copper and metal oxides. Lower film 16 may be modified so that the heat generated by the incident solar energy will be transmitted readily through the thickness. A liquid, powder or film may be laminated to the surface of lower film 16, and/or particles, such as metallic particles, may be added to lower film 16 to increase its thermal conductivity. Coatings and mixtures of powdered metals and metal oxides, as well as threads, filaments, filings and compounds placed on and/or located within lower film 16 may improve its thermal conductivity. Preferably, lower film 16 has a light absorption of about fifty percent, that is about fifty percent of the light energy heats the surface and about fifty percent passes through for deep water heating. This can be varied for specific use.

A typical outside diameter for heater 10 is sixty inches, although other diameters could be used to better accommodate pools of various size and shape. The small amount of open water 96 between heaters 10 is desirable as a small amount of direct sunlight is beneficial to prevent growth of undesirable alga such as mustard algae.

Figure 6:
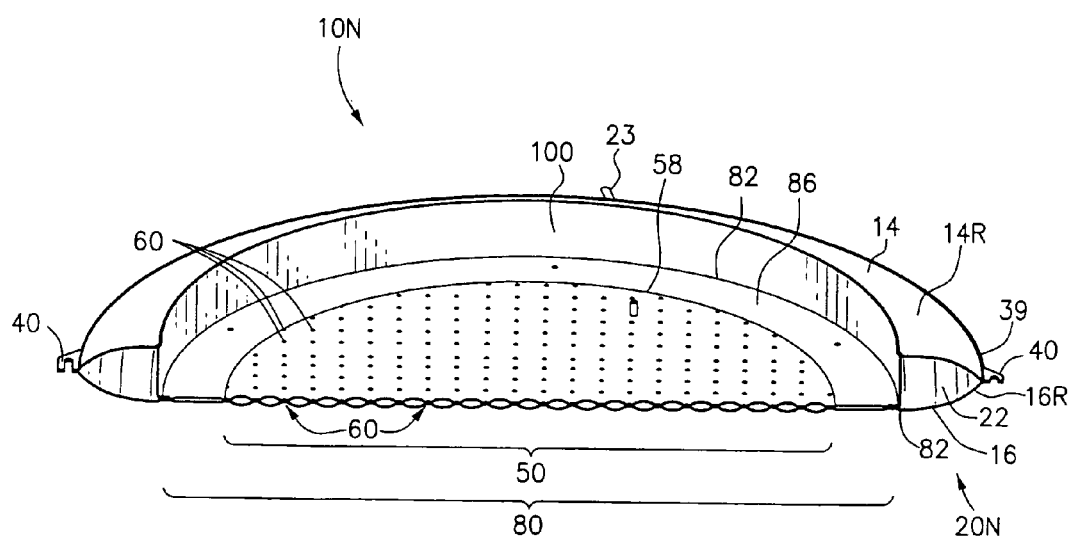
FIG. 6 is half section perspective view of the heater of FIG. 5.
Figure 7:
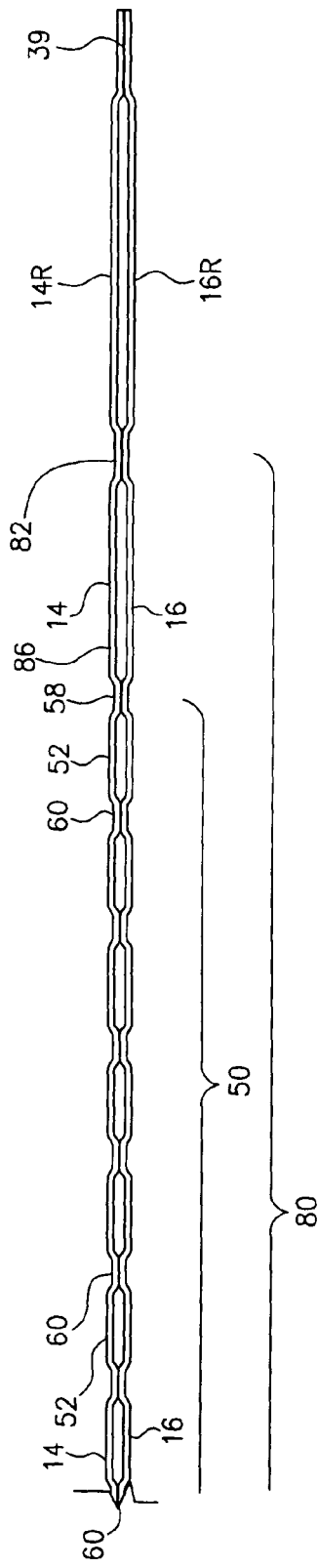
FIG. 7 is a partial sectional view of a partial construction of the heater of FIG. 5.

With specific reference to the present invention, FIG. 5 is a one-half top plan view of an exemplary embodiment of a floating pool heater 10N of the present invention; FIG. 6 is half section perspective view of heater 10N of FIG. 5; FIG. 7 is a partial sectional view of a partial construction of heater 10N of FIG. 5; and FIG. 8 is partial sectional view taken on line 8-8 of FIG. 5.

Looking at FIGS. 5 and 6, heater 10N is similar to heater 10 except for the differences described below. Upper planar film 14 is disposed on top of lower planar film 16 and bonded thereto at an inner peripheral bond 82, at a central peripheral bond 58, and at an outer peripheral bond 39. Inner peripheral bond 82 defines an inner portion 80 central thereto. Central peripheral bond 58 is within inner portion 80 and forms an inflatable central portion 50 central thereof having an inflatable cavity 52 between lower film 16 and upper film 14. A spacer ring 86 is disposed between central peripheral bond 58 and inner peripheral bond 82 within inner portion 80. Spacer ring 86 is not inflated. Spacer ring 86 is sufficiently flexible and deformable so as to spread out the distribution of contraction stress from the central portion 50 on outer ring 20. The more equally distributed the contraction stresses, the less likely is outer ring 20 to buckle.

As shown, the peripheral bonds 58, 82, 39 are circular, but may be hexagonal or octagonal or other shapes. Inner peripheral bond 82 has a length.

Figure 8:
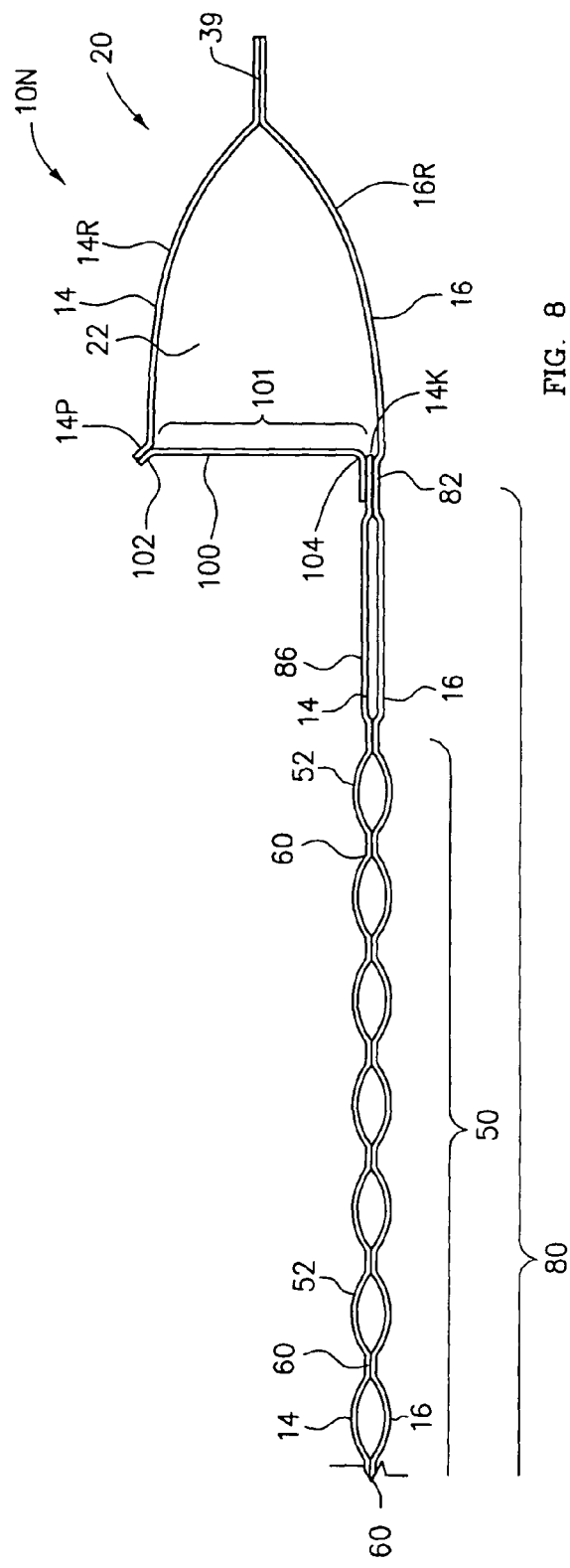
FIG. 8 is partial sectional view taken on line 8-8 of FIG. 5.

FIGS. 7 and 8 best show the construction of the exemplary embodiment of heater 10N. FIG. 7 is a partial sectional view of a partial construction of heater 10N of FIG. 5 taken through spot welds 60 of central portion 50. To convert this configuration of FIG. 7 to the buckle-resistant outer ring 20 of heater 10N of FIG. 8, upper film 14R of outer ring 20 is cut at or outwardly adjacent inner peripheral bond 82 so as to have an inner cut edge 14K and an outer cut edge 14P.

An additional band 100 of film having a width 101 an upper edge 102, a lower edge 104, and a length equal to the length of inner peripheral bond 82 is positioned in the cut in upper film 14R wherein said lower edge 104 is bonded to inner cut edge 14K and upper edge 102 is bonded to outer cut edge 14P to form an inflatable outer ring 20N bounded by band 100, by lower film 16R between inner peripheral bond 82 and outer peripheral bond 39, and by upper film 14R between band 100 and outer peripheral bond 39. Thus, it is seen that band 100 is a vertical member at inner peripheral bond 82. Band 100 resists the inward pull due to the inflation of inner portion 50 and prevents buckling of ring 20N. Width 101 provides a vertical webbing to prevent buckling. Width 101 would typically be in the range of one to three inches. In a preferred embodiment, width 101 is about 1.75 inches.

The above-described ring 20N exemplifies a preferred construction. Alternatively, ring 20N could be constructed in a different manner, such as independently of films 14, 16 and inner portion 80, but still having band 100 as a vertical member at along inner peripheral bond 82 and having a length equal to the length of inner peripheral bond 82 and having a lower edge 104 connected to inner peripheral bond 82 and an upper edge 102. The radially outward side of ring 20N could be almost any configuration of film enclosing chamber 22 between upper edge 102 of vertical band 100 and lower edge 104 of band 100.

Spacer ring 86 may be omitted such that central peripheral bond 58 and inner peripheral bond 82 are the same element.

From the foregoing description, it is seen that the present invention provides a floating solar pool heater with an outer ring that resists buckling such that the central portion remains in contact with the water Although a particular embodiment of the invention has been illustrated and described, various changes may be made in the form, composition, construction, and arrangement of the parts herein without sacrificing any of its advantages. For example, although heater 10 is shown as circular in top view, it could have other shapes. Therefore, it is to be understood that all matter herein is to be interpreted as illustrative and not in any limiting sense, and it is intended to heater in the appended claims such modifications as come within the true spirit and scope of the invention.

We claim:

1. A soft, flexible, floating solar heater for floating on liquid comprising:
   an inner portion comprising:
      a lower film;
      an upper film disposed on top of said lower film and bonded thereto at an inner peripheral bond to form an inner portion and; said inner peripheral bond having a length; said inner portion including an inflatable central portion between said lower film and said upper film; and
   an inflatable outer ring enclosing a chamber including:
      a radially inward side comprising:
         a vertical band of film having a length equal to the length of said inner peripheral bond and having a lower edge connected to said inner peripheral bond; and an upper edge; and
      a radially outward side of film enclosing said chamber between said upper edge of said vertical band and said lower edge of said band.

2. The solar heater of claim 1:
   said upper film having higher transmissivity of sunlight such that sunlight thereupon readily enters said inflatable central portion; said lower film having higher absorptivity of sunlight such that a portion of the sunlight thereupon warms said lower film; said lower film of said central portion being substantially in contact with the liquid for transferring heat thereto.

3. The solar heater of claim 2:
   said upper film being transparent.

4. The solar heater of claim 3:
   said lower film having sunlight absorptivity of greater than forty percent.

5. The solar heater of claim 1 further including:
   a plurality of spot welds connecting said lower film of said central portion to said upper film of said central portion so as to hold said upper and lower films in close proximity.

6. The solar heater of claim 1 further including
   a plurality of spaced spot welds connecting said lower film of said central portion to said upper film of said central portion so as to hold said upper and lower films in close proximity and so as to form a plurality of convex surfaces in said upper film; each said convex surface being located between a plurality of adjacent spot welds, each said convex surface acting as a lens for intensifying the sunlight on said lower film.

7. The solar heater of claim 1 wherein said inner portion includes:
   a central peripheral bond central of said inner peripheral bond and enclosing said inflatable central portion; and
   a spacer ring between said central peripheral bond and said inner peripheral bond.

8. A soft, flexible, floating solar heater for floating on liquid comprising:
   a lower film;
   an upper film disposed on top of said lower film and bonded thereto at a inner peripheral bond to form an inner portion and bonded thereto at an outer peripheral bond; said inner peripheral bond having a length; said inner portion including an inflatable central portion between said lower and said upper films; said upper film being cut at or outwardly adjacent said inner peripheral bond so as to have an inner cut edge and an outer cut edge;
   a band of film having a width, an upper edge, a lower edge, and a length equal to the length of said inner peripheral bond; said band of film positioned in the cut in said upper film wherein said lower edge is bonded to said inner cut edge or to said inner peripheral bond and said upper edge is bonded to said outer cut edge to form an inflatable outer ring bounded by said lower film between said inner peripheral bond and said outer peripheral bond and by said band and by said upper film between said band and said outer peripheral bond; and
   valve means for selectively controlling ingress and egress of gas with said inflatable central portion and said inflatable outer ring such that said solar heater floats on the liquid.

9. The solar heater of claim 8:
   said upper film having higher transmissivity of sunlight such that sunlight thereupon readily enters said inflatable central portion; said lower film having higher absorptivity of sunlight such that a portion of the sunlight thereupon warms said lower film; said lower film of said central portion being substantially in contact with the liquid for transferring heat thereto.

10. The solar heater of claim 9:
said upper film being transparent.

11. The solar heater of claim 10:
said lower film having sunlight absorptivity of greater than forty percent.

12. The solar heater of claim 8 further including:
a plurality of spot welds connecting said lower film of said central portion to said upper film of said central portion so as to hold said upper and lower films in close proximity.

13. The solar heater of claim 8 further including
a plurality of spaced spot welds connecting said lower film of said central portion to said upper film of said central portion so as to hold said upper and lower films in close proximity and so as to form a plurality of convex surfaces in said upper film; each said convex surface being located between a plurality of adjacent spot welds, each said convex surface acting as a lens for intensifying the sunlight on said lower film.

14. A soft, flexible, floating solar heater for floating on liquid comprising:
a lower film;
an upper film disposed on top of said lower film and bonded thereto at a inner peripheral bond to form an inner portion and bonded together at a central peripheral bond within said inner portion to form an inflatable central portion and to form a spacer ring between said central peripheral bond and said inner peripheral bond, and bonded together at an outer peripheral bond; said inner peripheral bond having a length; said upper film being cut at or outwardly adjacent said inner peripheral bond so as to have an inner cut edge and an outer cut edge;
a band of film having a width, an upper edge, a lower edge, and a length equal to the length of said inner peripheral bond; said band of film positioned in the cut in said upper film wherein said lower edge is bonded to said inner cut edge or to said inner peripheral bond and said upper edge is bonded to said outer cut edge to form an inflatable outer ring bounded by said lower film between said inner peripheral bond and said outer peripheral bond, by said band, and by said upper film between said band and said outer peripheral bond; and
valve means for selectively controlling ingress and egress of gas with said inflatable central portion and said inflatable outer ring such that said solar heater floats on the liquid.

15. The solar heater of claim 14:
said upper film having higher transmissivity of sunlight such that sunlight thereupon readily enters said inflatable central portion; said lower film having higher absorptivity of sunlight such that a portion of the sunlight thereupon warms said lower film; said lower film of said central portion being substantially in contact with the liquid for transferring heat thereto.

16. The solar heater of claim 15:
said upper film being transparent.

17. The solar heater of claim 16:
said lower film having sunlight absorptivity of greater than forty percent.

18. The solar heater of claim 14 further including:
a plurality of spot welds connecting said lower film of said central portion to said upper film of said central portion so as to hold said upper and lower films in close proximity.

19. The solar heater of claim 14 further including
a plurality of spaced spot welds connecting said lower film of said central portion to said upper film of said central portion so as to hold said upper and lower films in close proximity and so as to form a plurality of convex surfaces in said upper film; each said convex surface being located between a plurality of adjacent spot welds, each said convex surface acting as a lens for intensifying the sunlight on said lower film.

* * * * *